(12) United States Patent
Seo et al.

(10) Patent No.: US 8,817,222 B2
(45) Date of Patent: Aug. 26, 2014

(54) OPTICAL ELEMENT

(71) Applicant: LG Chem, Ltd., Seoul (KR)

(72) Inventors: Eun Mi Seo, Daejeon (KR); Sin Young Kim, Daejeon (KR); Kyun Il Rah, Daejeon (KR); Moon Soo Park, Daejeon (KR); Seung Hun Chae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/889,971

(22) Filed: May 8, 2013

(65) Prior Publication Data

US 2013/0242213 A1 Sep. 19, 2013

Related U.S. Application Data

(63) Continuation of application No. PCT/KR2011/008595, filed on Nov. 10, 2011.

(30) Foreign Application Priority Data

| Nov. 10, 2010 | (KR) | ......... | 10-2010-0111757 |
| Dec. 7, 2010 | (KR) | ......... | 10-2010-0124411 |
| Jun. 15, 2011 | (KR) | ......... | 10-2011-0057830 |
| Oct. 26, 2011 | (KR) | ......... | 10-2011-0110092 |
| Oct. 26, 2011 | (KR) | ......... | 10-2011-0110093 |
| Oct. 26, 2011 | (KR) | ......... | 10-2011-0110096 |
| Nov. 10, 2011 | (KR) | ......... | 10-2010-0111758 |
| Nov. 10, 2011 | (KR) | ......... | 10-2011-0117229 |

(51) Int. Cl.
*G02F 1/1333* (2006.01)
*C09K 19/02* (2006.01)
*G02B 5/30* (2006.01)
*G02B 27/22* (2006.01)
*G02B 27/26* (2006.01)

(52) U.S. Cl.
CPC .......... *G02B 5/3016* (2013.01); *G02B 27/2214* (2013.01); *G02B 27/26* (2013.01)
USPC ................. 349/183; 349/86; 349/88; 349/89; 349/184; 349/185

(58) Field of Classification Search
CPC .................... G02F 1/1334; G02F 2001/13775; G02F 1/133365
USPC ...................... 349/86–91, 168–172, 183–184
See application file for complete search history.

(56) References Cited

U.S. PATENT DOCUMENTS

| 2006/0130701 | A1* | 6/2006 | Salz et al. ....................... 106/35 |
| 2008/0194730 | A1* | 8/2008 | Klee et al. ...................... 523/118 |
| 2009/0197019 | A1* | 8/2009 | Harris et al. ................. 428/1.31 |

FOREIGN PATENT DOCUMENTS

| JP | 09-005521 | 1/1997 |
| JP | 10-153707 | 6/1998 |
| KR | 10-2010-0034726 | 4/2010 |
| KR | 10-2010-0058462 | 6/2010 |

* cited by examiner

*Primary Examiner* — Hoan C Nguyen
(74) *Attorney, Agent, or Firm* — McKenna Long & Aldridge, LLP

(57) ABSTRACT

An optical element and a stereoscopic image display device are provided. The optical element is a light-dividing element, for example an element that can divide incident light into at least two kinds of light having different polarized states. Therefore, the optical element can be used to realize a stereoscopic image.

22 Claims, 7 Drawing Sheets

Fig. 3

| A | B | A | B | A | B |
|---|---|---|---|---|---|
| B | A | B | A | B | A |
| A | B | A | B | A | B |
| B | A | B | A | B | A |
| A | B | A | B | A | B |
| B | A | B | A | B | A |

Fig. 10

| LG | RG | LG | RG | LG | RG |
|----|----|----|----|----|----|
| RG | LG | RG | LG | RG | LG |
| LG | RG | LG | RG | LG | RG |
| RG | LG | RG | LG | RG | LG |
| LG | RG | LG | RG | LG | RG |
| RG | LG | RG | LG | RG | LG |

OPTICAL ELEMENT

CROSS-REFERENCE TO RELATED APPLICATION

This application is a Continuation Bypass of International Application No. PCT/KR2011/008595, filed Nov. 10, 2011, and claims the benefit of Korean Application Nos. 10-2010-0111757 filed on Nov. 10, 2010, 10-2010-0111758 filed on Nov. 10, 2010, 10-2010-0124411, filed Dec. 7, 2010, 10-2011-0057830, filed Jun. 15, 2011, 10-2011-0110092, filed Oct. 26, 2011, 10-2011-0110093, filed Oct. 26, 2011, 10-2011-0110096, filed Oct. 26, 2011, and 10-2011-0117229, filed Nov. 10, 2011 all of which are hereby incorporated by reference in their entirety for all purposes as if fully set forth herein.

BACKGROUND

1. Field of the Invention

The present invention relates to an optical element and a stereoscopic image display device.

2. Discussion of Related Art

Techniques of dividing light into at least two kinds of light having different polarized states may be effectively used in various fields.

The light division techniques may be, for example, applied to manufacture of stereoscopic images. The stereoscopic images may be realized using binocular disparity. For example, when two 2-dimensional images are input into the human left and right eyes, respectively, the input information is transmitted and combined in the brain, which makes it possible for a human being to experience 3-dimensional (3D) senses of depth and reality. Therefore, the light division techniques may be used during this procedure.

Techniques of generating a stereoscopic image may be effectively used for 3D measurements, and also used in 3D TV, cameras or computer graphics.

SUMMARY OF THE INVENTION

The present invention is directed to providing an optical element and a stereoscopic image display device.

One aspect of the present invention provides an optical element. The optical element according to one exemplary embodiment of the present invention includes a polarizer and a liquid crystal layer, and also may include an adhesive layer attaching the polarizer to the liquid crystal layer.

According to one exemplary embodiment, the term "optical element" may refer to all kinds of optical instruments, optical parts or optical devices, each of which exhibits one or more optically intended functions. According to one exemplary embodiment, the optical element may also mean an element having a sheet or film shape. For example, the optical element may be an element that divides incident light into two or more kinds of light having different polarized states. Such an element may be, for example, used to obtain a stereoscopic image.

The adhesive layer may include an active energy ray-curable adhesive composition in a cured state, wherein the adhesive composition includes a radically polymerizable compound. In this specification, the term "curing" may refer to a process for the composition to exhibit an adhesive property or pressure-sensitive adhesivity through a physical or chemical action or reaction of a component included in a composition. As such, the term "active energy ray-curable composition" may also refer to a kind of a composition whose curing is induced by irradiation with active energy rays. As such, the "active energy rays" may include particle beams such as alpha-particle beams, proton beams, neutron beams or electron beams, as well as microwaves, infrared rays (IR), ultraviolet rays (UV), X rays and gamma rays. In general, the UV rays or electron beams may be used herein.

The radically polymerizable compound may be a compound containing a radical polymerizable functional group, for example an acrylamide-based compound. The term "radical polymerizable functional group" may refer to a functional group that can take part in polymerization or a cross-linking reaction using a free radical. Such polymerization or cross-linking reaction may be, for example, induced by irradiation with active energy rays.

The acrylamide-based radically polymerizable compound may be a compound represented by the following Formula 1.

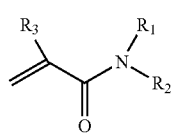

Formula 1

In Formula 1, $R_1$ and $R_2$ are each independently hydrogen, an alkyl group or a hydroxyalkyl group, $R_1$ and $R_2$ are joined together to form a heterocyclic structure containing a nitrogen atom, and $R_3$ is hydrogen or an alkyl group.

Unless otherwise defined in this specification, the term "alkyl group" may refer to an alkyl group having 1 to 20 carbon atoms, 1 to 16 carbon atoms, 1 to 12 carbon atoms, 1 to 8 carbon atoms or 1 to 4 carbon atoms. The alkyl group may be linear, branched or cyclic, and may be substituted or unsubstituted with one or more substituents.

In this specification, examples of the substituent that may be substituted with a certain functional group may include an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but the present invention is not limited thereto.

In Formula 1, $R_1$ and $R_2$ may be each independently hydrogen, an alkyl group or a hydroxyalkyl group, and may be optionally joined together to form a heterocyclic structure containing a nitrogen atom.

Unless otherwise defined in this specification, the term "heterocyclic structure" may refer to a cyclic compound having at least two different atoms as ring-membered atoms. In Formula 1, the heterocyclic structure may include 3 to 20, 3 to 16, 3 to 12 or 3 to 8 ring-membered atoms, as well as the nitrogen atom in Formula 1 in which $R_1$ and $R_2$ are joined together. In addition to the nitrogen atom, an atom that may be included in the heterocyclic structure may be carbon, oxygen or sulfur. Also, the heterocyclic structure may include an additional nitrogen atom in addition to the nitrogen atom in Formula 1 in which $R_1$ and $R_2$ are joined together as long as the nitrogen atom may be used to form a heterocyclic structure. The heterocyclic structure may have no unsaturated bond such as a carbon-carbon double bond, and may have at least one unsaturated bond, when necessary. Also, the heterocyclic structure may be optionally substituted with at least one substituent.

Examples of the compound of Formula 1 may include (meth)acrylamide, N-alkyl acrylamide, N-hydroxyalkyl (meth)acrylamide, N-acryloyl morpholine, N-methylolacrylamide or N-isopropylacrylamide, but the present invention is not limited thereto.

Also, the adhesive composition may further include a radically polymerizable compound having a heterocyclic acetal structure. In this specification, the term "heterocyclic acetal structure" may refer to a heterocyclic structure including a structure in which two oxygen atoms are bound to the same carbon atom through a single bond. That is, the compound may refer to a compound containing both of a functional group having a heterocyclic acetal structure and the radical polymerizable functional group. For example, the compound may serve as a diluent to regulate the viscosity of a composition, and may also serve to improve an adhesive strength of an adhesive layer and a phase retardation layer, more particularly, a layer including the reactive mesogen compound in a polymerized form.

The heterocyclic acetal structure may have 4 to 20, 4 to 16, 4 to 12 or 4 to 8 ring-membered atoms, and may be optionally substituted with at least one substituent.

The heterocyclic acetal structure may be represented by the following Formula 2 or 3. Therefore, the radically polymerizable compound may include a monovalent residue derived from the compound of the following Formula 2 or 3 together with the radical polymerizable functional group.

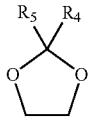

Formula 2

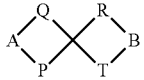

Formula 3

In Formula 2 or 3, $R_4$ and $R_5$ each independently represent hydrogen or an alkyl group, Q, P, R and T are each independently a carbon atom or an oxygen atom, provided that two out of Q, P, R and T are oxygen atoms, and A and B each independently represent an alkylene or alkylidene group having 1 to 5 carbon atoms.

In Formula 3, the alkylene group or alkylidene group may be optionally substituted with at least one substituent.

The radically polymerizable compound having the heterocyclic acetal structure may be particularly a compound represented by the following Formula 4.

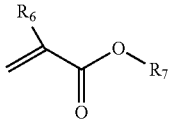

Formula 4

In Formula 4, $R_6$ represents hydrogen or an alkyl group, and $R_7$ is a monovalent residue derived from the structure of Formula 2 or 3, or an alkyl group substituted with the monovalent residue.

Examples of the compound represented by Formula 4 may include (2-ethyl-2-methyl-1,3-dioxolane-4-yl)methyl acrylate, (2-isobutyl-2-methyl-1,3-dioxolane-4-yl)methyl acrylate or (1,4-dioxaspiro[4,5]dec-2-yl)methyl acrylate, but the present invention is not limited thereto.

The radically polymerizable compound having a heterocyclic acetal structure may be, for example, included in an amount of 0.5 parts by weight to 40 parts by weight, 3 parts by weight to 20 parts by weight or 5 parts by weight to 10 parts by weight, relative to 100 parts by weight of the acrylamide-based compound. In this specification, the unit "part(s) by weight" refers to a weight ratio of respective components. A ratio of the components of the adhesive composition may be adjusted to provide an adhesive composition having excellent curing efficiency and improved physical properties after being cured.

Also, the adhesive composition may further include a radical polymerizable oligomer. The term "radical oligomer" may generally refer to a compound in which two or more monomers are polymerized or joined together, which has a radical polymerizable functional group.

The radical polymerizable oligomer is generally referred to as a photoreactive oligomer, and the radical polymerizable oligomer that may be used herein may include urethane acrylate, polyester acrylate, polyether acrylate or epoxy acrylate, and preferably urethane acrylate, but the present invention is not limited thereto.

In the adhesive composition, the radical polymerizable oligomer may be, for example, included in an amount of 1 part by weight to 40 parts by weight, preferably 1 part by weight to 20 parts by weight, relative to 100 parts by weight of the acrylamide-based compound. The addition effects may be maximized within this weight ratio.

In addition, the adhesive composition may further include a compound represented by the following Formula 5.

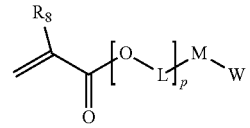

Formula 5

In Formula 5, $R_8$ represents hydrogen or an alkyl group, L represents an alkylene group or an alkylidene group, M represents a single bond, an oxygen atom or a sulfur atom, W represents an aryl group, and p represents an integer ranging from 0 to 3.

In Formula 5, the term "single bond" means that no additional atoms are present in a moiety represented by M. In this case, L and W are directly bound to each other.

Also, unless otherwise defined in this specification, the term "alkylene group or alkylidene group" may refer to an alkylene group or alkylidene group having 1 to 20 carbon atoms, 1 to 16 carbon atoms, 1 to 12 carbon atoms 1 to 8 carbon atoms or 1 to 4 carbon atoms. The alkylene group or alkylidene group may be linear, branched or cyclic, and may also be optionally substituted or unsubstituted with one or more substituents.

Unless otherwise defined in this specification, the term "aryl group" may refer to a monovalent residue derived from a compound or a derivative thereof, which includes a benzene ring or has a structure in which two or more benzene rings are condensed or joined together. The aryl group may be, for example, an aryl group having 6 to 22 carbon atoms, preferably 6 to 16 carbon atoms, and more preferably 6 to 13 carbon atoms, such as a phenyl group, a phenylethyl group, a phenylpropyl group, a benzyl group, a tolyl group, a xylyl group or a naphthyl group.

Also, in Formula 5, p may be preferably 0 or 1.

Examples of the compound of Formula 5 may include phenoxy ethyl (meth)acrylate, benzyl (meth)acrylate, 2-phenylthio-1-ethyl (meth)acrylate, 6-(4,6-dibromo-2-isopropyl phenoxy)-1-hexyl (meth)acrylate, 6-(4,6-dibromo-2-sec-butyl phenoxy)-1-hexyl (meth)acrylate, 2,6-dibromo-4-nonylphenyl (meth)acrylate, 2,6-dibromo-4-dodecyl phenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate. In general, phenoxy ethyl (meth)acrylate, benzyl (meth)acrylate 2-phenylthio-1-ethyl acrylate, 8-(2-naphthyloxy)-1-octyl acrylate and 2-(1-naphthyloxy)-ethyl acrylate, preferably phenoxy ethyl (meth)acrylate and benzyl (meth)acrylate may be used herein, but the present invention is not limited thereto.

In the adhesive composition, the compound of Formula 5 may be, for example, included in an amount of 5 parts by weight to 40 parts by weight or 10 parts by weight to 30 parts by weight, relative to 100 parts by weight of the acrylamide-based compound. The addition effects may be maximized within this weight ratio.

In addition, the adhesive composition may further include a compound represented by the following Formula 6.

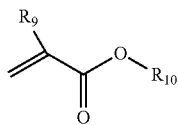

Formula 6

In Formula 6, $R_9$ represents hydrogen or an alkyl group, and $R_{10}$ represents a monovalent alicyclic hydrocarbon group.

In Formula 6, the monovalent alicyclic hydrocarbon group refers to a compound in which a carbon atom is bound in a ring shape, for example, a monovalent residue derived from a compound other than the aromatic compound or a derivative thereof. The alicyclic hydrocarbon group may be an alicyclic hydrocarbon group having 3 to 20 carbon atoms, preferably 5 to 15 carbon atoms, and more preferably 8 to 12 carbon atoms. For example, the alicyclic hydrocarbon group may include an isobornyl group, a cyclohexyl group, a norbornanyl group, a norbornenyl group, a dicyclopentadienyl group, an ethynylcyclohexane group, an ethynylcyclohexene group or an ethynyldecahydronaphthalene group, and an isobornyl group is preferred, but the present invention is not limited thereto.

For example, isobornyl acrylate may be used as the compound of Formula 6, but the present invention is not limited thereto.

In the adhesive composition, the compound of Formula 6 may be, for example, included in an amount of 5 parts by weight to 30 parts by weight or 10 parts by weight to 20 parts by weight, relative to 100 parts by weight of the acrylamide-based compound. The addition effects may be maximized within this weight ratio.

The adhesive composition may further include a radically polymerizable compound, for example, a compound containing a hydroxyl group. According to one exemplary embodiment, the radically polymerizable compound may be a compound having both of a hydroxyl group and a radical polymerizable functional group.

The radically polymerizable compound having a hydroxyl group may be a compound represented by the following Formula 7.

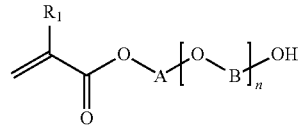

Formula 7

In Formula 7, $R_1$ represents hydrogen or an alkyl group, A and B each independently represent an alkylene group or an alkylidene group, and n represents an integer ranging from 0 to 5.

In Formula 1, n may be preferably in a range of 0 to 3, and more preferably 0 to 2.

Examples of the compound of Formula 1 may include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, but the present invention is not limited thereto.

In the adhesive composition, the radically polymerizable compound having a hydroxyl group may be, for example, included in an amount of 10 parts by weight to 80 parts by weight or 20 parts by weight to 60 parts by weight, relative to 100 parts by weight of the acrylamide-based compound.

The addition effects may be maximized within this weight ratio.

The adhesive composition may further include a radical initiator. For example, a radical photoinitiator may be used as the radical initiator. For example, an initiator such as a benzoin initiator, a hydroxyketone compound, an aminoketone compound or a phosphine oxide compound may be used as the radical photoinitiator, and a phosphine oxide compound may be preferred. More particularly, examples of the radical photoinitiator may include benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphine oxide and 2,4,6-trimethylbenzoyl-diphenyl-phosphine oxide, but the present invention is not limited thereto.

In the adhesive composition, the photoinitiator may be included in an amount of 0.1 parts by weight to 10 parts by weight or 1 part by weight to 5 parts by weight, relative to 100 parts by weight of the acrylamide-based compound. In this case, the effective polymerization or cross-linking may be induced within this content range, thereby preventing degradation of physical properties caused by a remaining reactive material.

In addition to the above-described components, the adhesive composition may further include at least one known additive such as a cationic polymerizable compound, a cationic initiator, a photosensitizer, a plasticizer or a silane coupling agent, when necessary.

The adhesive layer may be formed by curing the adhesive composition. For example, the adhesive composition may be cured by irradiation with active energy rays so that a polymerization reaction can be initiated. A light source used to irradiate active energy rays is not particularly limited, but a light source capable of irradiating active energy rays having an emission distribution at a wavelength of 400 nm or less is preferred. For example, the light source may include a low-pressure, medium-pressure, high-pressure or ultra high-pressure mercury lamp, a chemical lamp, a black light lamp, a microwave-excited mercury lamp or a metal halide lamp. The irradiation intensity of the active energy rays is determined according to components of the composition, but the present invention is not particularly limited thereto. Here, the irradiation intensity at a wavelength region in which the initiator is effectively activated is preferably in a range of 0.1 mW/cm$^2$ to 6,000 mW/cm$^2$. When the irradiation intensity is 0.1 mW/cm$^2$ or more, a reaction time is not too long, whereas, when the irradiation intensity is 6,000 mW/cm$^2$ or less, it is possible to prevent yellowing or degradation caused by heat radiated from the light source and heat generated during the curing of the composition. The irradiation time is adjusted according to a composition to be cured, but the present invention is not particularly limited thereto. In this case, the irradiation time is preferably set so that an integrated light intensity expressed as the product of the irradiation intensity and the irradiation time can be in a range of 10 mJ/cm$^2$ to 10,000 mJ/cm$^2$. When the integrated light intensity is 10 mJ/cm$^2$ or more, active species derived from the initiator may be maintained at a sufficient amount to securely carry out a curing reaction, whereas, when the integrated light intensity is 10,000 mJ/cm$^2$ or less, the irradiation time is not too long, thereby maintaining good productivity.

The adhesive may have a glass transition temperature of 40° C. or higher, 50° C. or higher, 60° C. or higher, 70° C. or higher, 80° C. or higher, or 90° C. or higher. An optical element having excellent durability may be provided by attaching the polarizer to the liquid crystal layer using the adhesive having the above glass transition temperature. Also, the adhesive may serve to stably maintain a phase retardation property of the liquid crystal layer.

In addition, the adhesive may have a thickness of 6 μm or less, 5 μm or less or 4 μm or less. The durability of an adhesive property to the liquid crystal layer and a phase retardation property of the liquid crystal layer, may be suitably maintained within this thickness. As such, a lower limit of the thickness of the adhesive may be, for example, 0.1 μm, 0.3 μm or 0.5 μm.

The optical element includes a polarizer and a liquid crystal layer, which are attached to each other by means of the adhesive layer. FIG. 1 is a schematic diagram of an optical element 1 according to one exemplary embodiment, showing a structure of the optical element 1 in which a polarizer 12, an adhesive layer 11 and a liquid crystal layer 13 are sequentially formed.

The kind of the polarizer included in the optical element is not particularly limited. For example, the kind of a conventional polarizer such as a polyvinyl alcohol polarizer, which is uniaxially or biaxially elongated and to which an iodine or dichroic dye is adsorbed and aligned, may be used as the polarizer. Examples of the polyvinyl alcohol resin of the polarizer may include a gelled polyvinylacetate resin. A copolymer of monopolymer or vinyl acetate and another comonomer may be used as the polyvinylacetate resin. Examples of the other comonomer may include an unsaturated carboxylic acid, an olefin, a vinylether, an unsaturated sulfonic acid and an acrylamide having an ammonium group. A gelling degree of the polyvinyl alcohol resin may be generally in a range of 85 mol % to 100 mol %, preferably 98 mol % or more. The polyvinyl alcohol resin may be further modified. For example, aldehyde-modified polyvinyl formal or polyvinylacetal may be used herein.

The liquid crystal layer may have a difference between in-plane refractive indexes in a slow axis direction and a fast axis direction of 0.05 to 0.2, 0.07 to 0.2, 0.09 to 0.2 or 0.1 to 0.2. As such, the in-plane refractive index in the slow axis direction may refer to a refractive index in a direction in which the maximum value of the refractive index is defined with respect to the plane of the liquid crystal layer, and the in-plane refractive index in the fast axis direction may refer to a refractive index in a direction in which the minimum value of the refractive index is defined with respect to the plane of the liquid crystal layer. In general, the fast axis and slow axis in an optically anisotropic liquid crystal layer are formed vertically to each other. The refractive indexes may be measured with respect to light at a wavelength of 550 nm or 589 nm.

The liquid crystal layer may also have a thickness of approximately 0.5 μm to 2.0 μm or approximately 0.5 μm to 1.5 μm.

The liquid crystal layer satisfying the relationship of the refractive indexes and having the thickness may express a phase retardation property suitable for use in applications. According to one exemplary embodiment, the liquid crystal layer satisfying the relationship of the refractive indexes and having the thickness may be suitable for use in an optical element for optical division.

In addition, the liquid crystal layer may satisfy the conditions of the following Equation 1.

$$X < 8\% \qquad \text{Equation 1}$$

In Equation 1, X represents a percentage of the absolute value of a variation in a phase difference value of the liquid crystal layer obtained when the optical element is kept at 80° C. for 100 hours or 250 hours, relative to the initial phase difference value of the liquid crystal layer.

For example, X may be calculated as follows: $100 \times (|R_0 - R_1|)/R_0$. Here, $R_0$ is an initial phase difference value of the liquid crystal layer of the optical element, and $R_1$ represents a phase difference value of the liquid crystal layer obtained when the optical element is kept at 80° C. for 100 hours or 250 hours.

X may be preferably 7% or less, 6% or less or 5% or less. A variation of the phase difference value may be measured using a method presented in the following Examples.

A liquid crystal layer satisfying the above-described conditions may be, for example, embodied using the liquid crystal layer having the above-mentioned compositions.

The liquid crystal layer may include a multifunctional polymerizable liquid crystal compound and a monofunctional polymerizable liquid crystal compound in a polymerized form.

In this specification, the term "multifunctional polymerizable liquid crystal compound" may refer to a compound that shows a liquid crystalline property because it includes a mesogen backbone, and also contains two or more polymerizable functional groups. According to one exemplary embodiment, the multifunctional polymerizable liquid crystal compound may contain 2 to 10, 2 to 8, 2 to 6, 2 to 5, 2 to 4, 2 to 3, or 2 polymerizable functional groups.

In this specification, the term "monofunctional polymerizable liquid crystal compound" may also refer to a compound that shows a liquid crystalline property because it includes a mesogen backbone, and also contains one polymerizable functional group.

Also, in this specification, the expression "a polymerizable liquid crystal compound being included in a liquid crystal layer in a polymerized form" may refer to a state in which the liquid crystal compound is polymerized to form a liquid crystal polymer in the liquid crystal layer.

When the liquid crystal layer includes the multifunctional and monofunctional polymerizable compounds in a polymerized form, the liquid crystal layer may have more excellent phase retardation properties, and the realized phase retardation properties, for example, the optical axis and a phase retardation value of the liquid crystal layer, may be stably maintained under the severe conditions.

According to one exemplary embodiment, the multifunctional or monofunctional polymerizable liquid crystal compound may be a compound represented by the following Formula 8.

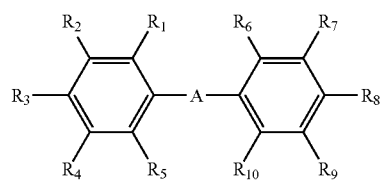

Formula 8

In Formula 8, A is a single bond, —COO— or —COO—, and $R_1$ to $R_{10}$ are each independently hydrogen, a halogen, an alkyl group, an alkoxy group, an alkoxycarbonyl group, a cyano group, a nitro group, —O-Q-P or a substituent of the following Formula 9, provided that at least one of the substituents $R_1$ to $R_{10}$ is —O-Q-P or a substituent of the following Formula 9, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

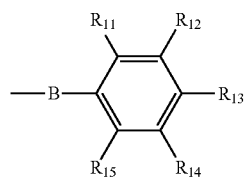

Formula 9

In Formula 9, B is a single bond, —COO— or —COO—, and $R_{11}$ to $R_{15}$ are each independently hydrogen, a halogen, an alkyl group, an alkoxy group, an alkoxycarbonyl group, a cyano group, a nitro group or —O-Q-P, provided that at least one of substituents $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is a polymerizable functional group such as an alkenyl group, an epoxy group, a cyano group, a carboxyl group, an acryloyl group, a methacryloyl group, an acryloyloxy group or a methacryloyloxy group.

In Formulas 8 and 9, the expression "two adjacent substituents are joined together to form a benzene ring substituted with —O-Q-P" may mean that the two adjacent substituents are joined together to form a naphthalene backbone substituted with —O-Q-P as a whole.

In Formula 9, "-" indicated on the left side of B may mean that B is directly bound to the benzene ring of Formula 8.

In Formulas 8 and 9, the term "single bond" means that no additional atoms are present in a moiety represented by A or B. For example, when A in Formula 8 is a single bond, the benzene rings disposed on both sides of A may be directly bound to form a biphenyl structure.

In Formulas 8 and 9, the halogen may be chlorine, bromine or iodine.

In Formula 9, the term "alkyl group" may refer to a linear or branched alkyl group having 1 to 20 carbon atoms, 1 to 16 carbon atoms, 1 to 12 carbon atoms, 1 to 8 carbon atoms or 1 to 4 carbon atoms, or a cycloalkyl group having 3 to 20 carbon atoms, 3 to 16 carbon atoms or 4 to 12 carbon atoms. The alkyl group may be optionally substituted with one or more substituents.

Unless otherwise defined in this specification, the term "alkoxy group" may refer to an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. Also, the alkoxy group may be optionally substituted with one or more substituents.

Also, unless otherwise defined in this specification, the term "alkenyl group" may refer to an alkenyl group having 2 to 20 carbon atoms, 2 to 16 carbon atoms, 2 to 12 carbon atoms, 2 to 8 carbon atoms or 2 to 4 carbon atoms. The alkenyl group may be linear, branched or cyclic. Also, the alkenyl group may be optionally substituted with one or more substituents.

Also, in Formulas 8 and 9, P may be preferably an acryloyl group, a methacryloyl group, an acryloyloxy group or a methacryloyloxy group, more preferably an acryloyloxy group or a methacryloyloxy group, and most preferably an acryloyloxy group.

In this specification, the substituent which may be substituted with a certain functional group may be an alkyl group, an alkoxy group, an alkenyl group, an epoxy group, an oxo group, an oxetanyl group, a thiol group, a cyano group, a carboxyl group, an acryloyl group, a methacryloyl group, an acryloyloxy group, a methacryloyloxy group or an aryl group, but the present invention is not limited thereto.

The —O-Q-P which may be present in plural numbers in Formulas 8 and 9 or the residue of Formula 9 may be, for example, present in a position of $R_3$, $R_8$ or $R_{13}$. Preferably, $R_3$ and $R_4$, or $R_{12}$ and $R_{13}$ may be joined together to form a benzene ring substituted with —O-Q-P. Also, in the compound of Formula 8 or the residue of Formula 9, the substituent other than the —O-Q-P or the residue of Formula 9, or the substituents other than those being joined together to form the benzene ring may be, for example, hydrogen, a halogen, a linear or branched alkyl group having 1 to 4 carbon atoms, an alkoxycarbonyl group containing a linear or branched alkoxy group having 1 to 4 carbon atoms, a cycloalkyl group having 4 to 12 carbon atoms, an alkoxy group having 1 to 4 carbon atoms, a cyano group or a nitro group, and preferably chlorine, a linear or branched alkyl group having 1 to 4 carbon atoms, a cycloalkyl group having 4 to 12 carbon atoms, an alkoxy group having 1 to 4 carbon atoms, an alkoxycarbonyl group containing a linear or branched alkoxy group having 1 to 4 carbon atoms, or a cyano group.

The liquid crystal layer may include the monofunctional polymerizable liquid crystal compound in an amount of greater than 0 parts by weight and less than 100 parts by weight, 1 part by weight to 90 parts by weight, 1 part by weight to 80 parts by weight, 1 part by weight to 70 parts by weight, 1 part by weight to 60 parts by weight, 1 part by weight to 50 parts by weight, 1 part by weight to 30 parts by weight or 1 part by weight to 20 parts by weight, relative to 100 parts by weight of the multifunctional polymerizable liquid crystal compound.

The mixing effect of the multifunctional and monofunctional polymerizable liquid crystal compounds may be maximized within this content range. Also, the liquid crystal layer may exhibit an excellent adhesive property to the adhesive layer. Unless otherwise defined in this specification, the unit "part by weight" may mean a weight ratio.

The multifunctional and monofunctional polymerizable liquid crystal compounds may be polymerized in a horizontally aligned state. In this specification, the term "horizontal alignment" may mean that the optical axis of a liquid crystal layer including a polymerized liquid crystal compound has an inclination angle of approximately 0° to approximately 25°, approximately 0° to approximately 15°, approximately 0° to approximately 10°, approximately 0° to approximately 5°, or approximately 0° with respect to a plane of the liquid crystal layer. In this specification, the term "optical axis" may refer to a fast axis or slow axis formed when incident light penetrates through a corresponding region.

According to one exemplary embodiment, the optical element may be an element that divides incident light into two or more kinds of light having different polarized states. Such an element may be, for example, used to obtain a stereoscopic image.

For this purpose, the liquid crystal layer may include, for example, first and second regions having different phase retardation properties. In this specification, the fact that the first and second regions have the different phase retardation properties may include a case in which the first and second regions have optical axes formed in the same or different directions and also have different phase retardation values, and a case in which the first and second regions have optical axes formed in different directions while having the same phase retardation value, in a state where both of the first and second regions have the phase retardation properties. According to another exemplary embodiment, the fact that the first and second regions have the different phase retardation properties may include a case in which one of the first and second regions has a phase retardation property, and the other region is an optically isotropic region having no phase retardation property. In this case, for example, the liquid crystal layer may be formed so that it can include both of a region including a liquid crystal material and a region free of the liquid crystal material. The phase retardation property of the first or second region may be regulated, for example, by controlling an alignment state of the liquid crystal compound, the refractive index relationship of the liquid crystal layer or a thickness of the liquid crystal layer.

According to one exemplary embodiment, the first region A and the second region B may be formed in stripe shapes extending in the same direction and alternately arranged adjacent to each other, as shown in FIG. 2, or they may be formed in a lattice pattern and alternately arranged adjacent to each other, as shown in FIG. 3.

When the optical element is used to display a stereoscopic image, one of the first and second regions may refer to a region configured to control polarization of an image signal for the left eye (hereinafter referred to as "LC region"), and the other region may refer to a region configured to control polarization of an image signal for the right eye (hereinafter referred to as "RC region").

According to one exemplary embodiment, the two or more kinds of light having the different polarized states, which are divided by the liquid crystal layer including the first and second regions, may include two kinds of linearly polarized light having directions, which are substantially vertical to each other, or include left-circularly polarized light and right-circularly polarized light.

Unless otherwise defined in this specification, when terms such as vertical, horizontal, perpendicular or parallel are used in definitions of angles, the terms refer to an angle being substantially vertical, horizontal, perpendicular or parallel. For example, the terms include errors in consideration of manufacturing errors or variations. Therefore, the terms may, for example, include an error of not more than approximately ±15°, preferably an error of not more than approximately ±10°, and most preferably an error of not more than approximately ±5°.

According to one exemplary embodiment, one of the first and second regions may be a region through which incident light penetrates without rotating the polarization axis of the incident light, and the other region may be a region through which incident light penetrates while the polarization axis of the incident light is rotated in a direction perpendicular to the polarization axis of the incident light which penetrates through the one of the first and second regions. In this case, the regions of the liquid crystal layer including the polymerizable liquid crystal compound in a polymerized form may be formed on only one of the first and second regions. As such, the regions in which the liquid crystal layer is not formed may be an empty space, or may be a region in which a glass, or optically isotropic resin layer, resin film or sheet is formed.

According to another exemplary embodiment, one of the first and second regions may be a region through which incident light can penetrate when the incident light is converted into left-circularly polarized light, and the other region may be a region through which incident light can penetrate when the incident light is converted into right-circularly polarized light. In this case, the first and second regions may be regions having optical axes formed in different directions while having the same phase retardation value, or one of the first and second regions may be a region in which incident light may be phase-retarded by ¼ of a wavelength of the incident light, and the other region may be a region in which incident light may be phase-retarded by ¾ of a wavelength of the incident light.

According to one exemplary embodiment, the first and second regions may have the same phase retardation value, for example, a value required to phase-retard incident light by ¼ of the wavelength of the incident light, and also have optical axes formed in different directions. As such, the optical axes formed in the different directions may be, for example, at right angles.

When the first and second regions have the optical axes formed in different directions, a line bisecting an angle formed between the optical axes of the first and the second regions is preferably drawn so that the line can be vertical or horizontal with respect to the absorption axis of the polarizer.

FIG. 4 is a schematic diagram explaining the arrangement of the optical axes of the first and second regions when the first and second regions A and B shown in FIG. 2 or 3 have optical axes formed in different directions. Referring to FIG. 4, a line bisecting an angle formed between the optical axes of the first and second regions A and B may refer to a line bisecting an angle of (θ1+θ2). For example, when θ1 and θ2 are the same angle, the angle-bisecting line may be formed in a direction horizontal with respect to a boundary line L between the first and second regions A and B. As such, an angle, namely (θ1+θ2), formed between the optical axes of the first and second regions A and B may also be, for example, 90°.

The optical element may further include a base layer formed on the liquid crystal layer in a position opposite to the adhesive layer. The base layer may have the liquid crystal layer formed thereupon. The base layer may have a single-layer or multilayer structure. When the optical element further includes the base layer, the liquid crystal layer may be attached to the polarizer by means of the adhesive. FIG. 5 is a schematic diagram showing an optical element 5 further including a base layer 51.

For example, a glass base layer or a plastic base layer may be used as the base layer. Examples of the plastic base layer may include a sheet or film including a cellulose resin such as triacetyl cellulose (TAC) or diacetyl cellulose (DAC); a cyclo olefin polymer (COP) such as a norbornene derivative; an acryl resin such as poly(methyl methacrylate) (PMMA); polycarbonate (PC); a polyolefin such as polyethylene (PE) or polypropylene (PP); polyvinyl alcohol (PVA); poly ether sulfone (PES); polyetheretherketone (PEEK); polyetherimide (PEI); polyethylene naphthalate (PEN); a polyester such as polyethylene terephthalate (PET); polyimide (PI); polysulfone (PSF); or a fluorine resin.

The base layer, for example, the plastic base layer, may have a lower refractive index than the liquid crystal layer. The refractive index of the base layer according to one exemplary embodiment is in a range of approximately 1.33 to approximately 1.53. When the base layer has a lower refractive index than the liquid crystal layer, it is, for example, desirable in that it enhances brightness, prevents reflection and improves contrast characteristics.

The plastic base layer may be optically isotropic or anisotropic. As such, when the base layer is optically anisotropic, the optical axis of the base layer is preferably arranged so that the optical axis of the base layer can be vertical or horizontal with respect to the above-mentioned line bisecting an angle formed between the optical axes of the first region and the second region.

According to one exemplary embodiment, the base layer may include a UV protector or absorbent. When the base layer includes the UV protector or absorbent, it is possible to prevent degradation of the liquid crystal layer caused by UV rays. Examples of the UV protector or absorbent may include an organic matter such as a salicylic acid ester compound, a benzophenone compound, an oxybenzophenone compound, a benzotriazol compound, a cyanoacrylate compound or a benzoate compound, or an inorganic matter such as zinc oxide or a nickel complex salt. The content of the UV protector or absorbent in the base layer is not particularly limited, and may be properly selected in consideration of desired effects. For example, in the manufacture of the plastic base layer, the UV protector or absorbent may be included in an amount of approximately 0.1% by weight to 25% by weight, based on the weight ratio of the main material of the base layer.

A thickness of the base layer is not particularly limited, and may be properly regulated according to a desired purpose of use. The base layer may have a single-layer or multilayer structure.

The optical element according to one exemplary embodiment may further include an alignment layer disposed between the base layer and the liquid crystal layer. The alignment layer may serve to align a liquid crystal compound during formation of the optical element. As the alignment layer, a conventional alignment layer known in the art, for example, an optical alignment layer or a rubbing alignment layer, may be used. The alignment layer is an optional configuration, and an alignment property may be granted without using an alignment layer by directly rubbing or elongating the base layer.

Also, the optical element may further include a protection layer attached to an upper portion of the polarizer. FIG. 6 is a schematic diagram showing an optical element 6 further including a protection layer 61 attached to an upper portion of a polarizer 12. For example, the protection layer may include a cellulose resin film such as a TAC (triacetyl cellulose) film; a polyester film such as a PET (poly(ethylene terephthalate)) film; a polycarbonate film; a polyethersulfone film; an acryl film; a polyolefin-based film such as a polyethylene, polypropylene or cyclic olefin resin film; or a resin layer that is cured to form a hard layer, but the present invention is not limited thereto.

In addition, the optical element may further include a phase retardation layer arranged on one surface of the polarizer. The phase retardation layer may be a ¼-wavelength phase retardation layer or a ½-wavelength phase retardation layer. The term "¼- or ½-wavelength phase retardation layer" may refer to a phase retardation element that can phase-retard incident light by ¼ or ½ of a wavelength of the incident light. For example, the optical element having such a structure may be effectively used as an element that is applied to an organic light emitting diode (OLED) to give a light division function and an anti-reflection function. For example, a polymer film which gives birefringence through an elongation process or a liquid crystal layer formed by polymerizing a polymerizable liquid crystal compound may be used as the phase retardation layer.

Also, the optical element may further include a pressure-sensitive adhesive layer formed on one surface of the polarizer. For example, the pressure-sensitive adhesive layer may be a pressure-sensitive adhesive layer used to attach the optical element to an optical instrument, for example, a liquid crystal panel of a liquid crystal display device or an image display element of a stereoscopic image display device. FIG. 7 is a schematic diagram showing an optical element 7 in which a pressure-sensitive adhesive layer 71 is formed on an upper portion of a polarizer 12.

The pressure-sensitive adhesive layer may have a storage modulus at 25° C. of 0.02 MPa or more, 0.03 MPa or more, 0.04 MPa or more, 0.05 MPa or more, 0.06 MPa or more, 0.07 MPa or more, 0.08 MPa, greater than 0.08 MPa, or 0.09 MPa or more. An upper limit of the storage modulus of the pressure-sensitive adhesive is not particularly limited. For example, the storage modulus may be 0.25 MPa or less, 0.2 MPa or less, 0.16 MPa or less, 0.1 MPa or less, or 0.08 MPa or less.

When the pressure-sensitive adhesive layer has this storage modulus, the optical element may show excellent durability, and thus show a stable light division property since the phase retardation property of the phase retardation layer is, for example, stably maintained for a long period of time under the severe conditions. Also, it is possible to prevent side effects such as light leakage in optical instruments using the optical element. In addition, the optical element may show excellent resistance to an external pressure or scratch due to its improved hardness property, thereby properly maintaining reworkability.

The pressure-sensitive adhesive layer may have a thickness of 25 μm or less, 20 μm or less, or 18 μm or less. When the pressure-sensitive adhesive layer has this thickness, the durability, hardness property and reworkability may be further improved. The pressure-sensitive adhesive layer shows excellent physical properties as the pressure-sensitive adhesive layer becomes thin. Here, a lower limit of the thickness is not particularly limited, but the thickness of the pressure-sensitive adhesive layers may be, for example, adjusted within a range of approximately 1 μm or more, or approximately 5 μm or more in consideration of processability.

The pressure-sensitive adhesive layer may include an acryl pressure-sensitive adhesive, a silicon pressure-sensitive adhesive, an epoxy pressure-sensitive adhesive or a rubber-based pressure-sensitive adhesive.

When the pressure-sensitive adhesive layer includes an acryl pressure-sensitive adhesive, the pressure-sensitive adhesive may be, for example, formed by curing a pressure-sensitive adhesive composition including a thermocurable component, an active energy ray-curable component, or both of the thermocurable component and the active energy ray-curable component.

As such, the term "curing" may mean a change in a chemical or physical state of a pressure-sensitive adhesive composition to exhibit a pressure-sensitive adhesive property. As such, the thermocurable component and active energy ray-curable component may also refer to a component whose curing is induced by application of suitable heat or irradiation of active energy rays as described above.

The pressure-sensitive adhesive layer formed of the pressure-sensitive adhesive composition including the thermocurable component may include an acrylic polymer cross-linked using a multifunctional cross-linking agent.

For example, an acrylic polymer having a weight average molecular weight of 500,000 or more may be used as the acrylic polymer cross-linked using the multifunctional cross-linking agent. In this specification, the weight average molecular weight is a value converted from that of a polystyrene standard as measured using GPC (gel permeation chromatography). Also, unless otherwise defined in this specification, the term "molecular weight" means a "weight average molecular weight." A polymer having a molecular weight of 500,000 or more may be used to form a pressure-sensitive adhesive layer having excellent durability under severe conditions. An upper limit of the molecular weight is not particularly limited, and the molecular weight of the acrylic polymer may be, for example, adjusted within 2,500,000 or less in consideration of the durability or a coating property of a composition.

According to one exemplary embodiment, the acrylic polymer may include a (meth)acrylic ester monomer and a cross-linking monomer as polymerization units.

For example, alkyl (meth)acrylate may be used as the (meth)acrylic ester-based monomer, and alkyl (meth)acrylate containing an alkyl group having 1 to 20 carbon atoms may be used in consideration of the cohesion, glass transition temperature or pressure-sensitive adhesivity of a pressure-sensitive adhesive. Examples of such a monomer may include methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, which may be used alone or in combination.

In addition, the polymer may further include a cross-linking monomer as a polymerization unit. For example, the polymer may include 80 parts by weight to 99.9 parts by weight of the (meth)acrylic ester monomer and 0.1 parts by weight to 20 parts by weight of the cross-linking monomer as polymerization units. As such, the term "cross-linking monomer" refers to a monomer that can be copolymerized with another monomer used to form an acrylic polymer and provide a cross-linking functional group to the polymer after the copolymerization. The cross-linking functional group may react with a multifunctional cross-linking agent as will be described later to form a cross-linking structure.

Examples of the cross-linking functional group may include a hydroxyl group, a carboxyl group, an epoxy group, an isocyanate group or a nitrogen-containing functional group such as an amino group. Copolymerizable monomers which can provide the above-mentioned cross-linking functional group in manufacture of a pressure-sensitive adhesive resin are widely known in the art. Examples of the cross-linking monomer may include, but are not limited to, a hydroxyl group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate; a carboxyl group-containing monomer such as (meth)acrylic acid, 2-(meth)acryloyloxy acetic acid, 3-(meth)acryloyloxy propyl acid, 4-(meth)acryloyloxy butyric acid, an acrylic acid dimer, itaconic acid, maleic acid and maleic anhydride, or a nitrogen-containing monomer such as (meth)acrylamide, N-vinyl pyrrolidinone or N-vinyl caprolactam, which may be used alone or in combination.

The acrylic polymer may include various other monomers as a polymerization unit, when necessary. Examples of the other monomers may include a nitrogen-containing monomer such as (meth)acrylonitrile, (meth)acrylamide, N-methyl (meth)acrylamide or N-butoxy methyl (meth)acrylamide; a styrene-based monomer such as styrene or methyl styrene; glycidyl (meth)acrylate; or a carboxylic acid vinyl ester such as vinyl acetate. Such additional monomers may be adjusted to a content of 20 parts by weight or less, relative to the total weight ratio of the other monomers.

The acrylic polymer may be prepared by subjecting a mixture of monomers obtained by optionally selecting and blending the above-described components through a polymerization method such as solution polymerization, photopolymerization, bulk polymerization, suspension polymerization or emulsion polymerization.

Examples of the multifunctional cross-linking agent serving to cross-link the above-described acrylic polymer in the pressure-sensitive adhesive layer may include conventional thermocurable cross-linking agents such as an isocyanate cross-linking agent, an epoxy cross-linking agent, an aziridine cross-linking agent and a metal chelate cross-linking agent. As such, examples of the isocyanate cross-linking agent may include a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound obtained by reacting the multifunctional isocyanate compound with a polyol compound such as trimethylol propane. Examples of the epoxy cross-linking agent may include at least one selected from the group consisting of ethyleneglycol diglycidyl ether, triglycidyl ether, trimethylolpropane triglycidyl ether, N,N,N',N'-tetraglycidyl ethylenediamine and glycerin diglycidyl ether, examples of the aziridine cross-linking agent may include at least one selected from the group consisting of N,N'-toluene-2,4-bis(1-aziridine-carboxamide), N,N'-diphenylmethane-4, 4'-bis(1-aziridine-carboxamide), triethylene melamine, bisisoprotaloyl-1-(2-methylaziridine) and tri-1-aziridinylphosphine oxide, and examples of the metal chelate cross-linking agent may include compounds obtained by coordinating a polyvalent metal such as aluminum, iron, zinc, tin, titanium, antimony, magnesium or vanadium with acetylacetone or ethyl acetoacetate, but the present invention is not limited thereto.

The multifunctional cross-linking agent present in a pressure-sensitive adhesive composition including a thermocurable component or a pressure-sensitive adhesive layer formed of the composition may be, for example, included in an amount of 0.01 parts by weight to 10 parts by weight or 0.01 parts by weight to 5 parts by weight, relative to 100 parts by weight of the acrylic polymer. When a content ratio of the cross-linking agent is adjusted to a content of 0.01 parts by weight or more, it is possible to effectively maintain cohesion of a pressure-sensitive adhesive, whereas, when the content ratio of the cross-linking agent is adjusted to a content of 10 parts by weight or less, it is possible to prevent interlayer detachment or lifting from being caused in the pressure-sensitive adhesive interface and maintain excellent durability. However, the weight ratio may be varied according to desired physical properties such as elastic modulus or inclusion of other cross-linking structures in the pressure-sensitive adhesive layer.

The pressure-sensitive adhesive layer formed of the pressure-sensitive adhesive composition including the active energy ray-curable component may include a cross-linking structure of a polymerized active energy ray-polymerizable compound. The pressure-sensitive adhesive layer may be, for example, formed by blending a compound including at least one functional group which can take part in a polymerization reaction by irradiation of active energy rays, such as, for example, an alkenyl group, an acryloyl group, a methacryloyl group, an acryloyloxy group or a methacryloyloxy group to prepare a pressure-sensitive adhesive composition, and cross-linking and polymerizing the component by irradiating the composition with active energy rays. As such, examples of the compound including the functional group which can take part in the polymerization reaction by irradiation of the active energy rays may include a polymer obtained by introducing a functional group such as an acryloyl group, a methacryloyl group, an acryloyloxy group or a methacryloyloxy group into a side chain of the acrylic polymer; a compound known as an active energy ray-curable oligomer in the art, such as urethane acrylate, epoxy acrylate, polyester acrylate or polyether acrylate; or a multifunctional acrylate as will be described later.

The pressure-sensitive adhesive layer formed of the pressure-sensitive adhesive composition including a thermocurable component and an active energy ray-curable component may have both of a cross-linking structure including an acrylic polymer cross-linked using a multifunctional cross-linking agent and a cross-linking structure including a polymerized active energy ray-polymerizable compound.

Such a pressure-sensitive adhesive layer is a pressure-sensitive adhesive including an interpenetrating polymer network (hereinafter referred to as "IPN"). The term "IPN" may refer to a state where at least two cross-linking structures are present in a pressure-sensitive adhesive layer. According to one exemplary embodiment, the cross-linking structures may be present in a state of entanglement, linking or penetration. When the pressure-sensitive adhesive layer includes the IPN, the pressure-sensitive adhesive layer may show excellent durability under the severe conditions, and also may be used to realize an optical element having excellent workability or an excellent ability to prevent light leakage or crosstalk.

The components listed in the items of the pressure-sensitive adhesive composition including the thermocurable component, may be, for example used as the multifunctional cross-linking agent and the acrylic polymer for the cross-linking structure, which is realized by the acrylic polymer cross-linked using the multifunctional cross-linking agent in the pressure-sensitive adhesive layer including the IPN.

Also, the above-described compounds may be used as the active energy ray-polymerizable compound for the cross-linking structure of the polymerized active energy ray-polymerizable compound.

According to one exemplary embodiment, the active energy ray-polymerizable compound may be a multifunctional acrylate. Compounds having at least two (meth)acryloyl groups may be used as the multifunctional acrylate without limitation. For example, the multifunctional acrylate that may be used herein may include a difunctional acrylate such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, hydroxyl puivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide-modified hexahydrophthalic di(meth)acrylate, tricyclodecane dimethanol(meth)acrylate, neopentylglycol-modified trimethylpropane di(meth)acrylate, adamantane di(meth)acrylate or 9,9-bis[4-(2-acryloyloxyethoxy)phenyl]fluorene; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or urethane (meth)acrylate (for example, a reaction product of an isocyanate monomer and trimethylolpropane tri(meth)acrylate, etc.).

Compounds having a ring structure within the molecule may be used as the multifunctional acrylate. The ring structure included in the multifunctional acrylate may be one of a carbocyclic structure or heterocyclic structure; and a monocyclic or polycyclic structure. Examples of the multifunctional acrylate having a ring structure may include a monomer having an isocyanurate structure, such as tris(meth)acryloxy ethyl isocyanurate, and a hexafunctional acrylate such as isocyanate-modified urethane (meth)acrylate (for example, a reaction product of an isocyanate monomer and trimethylolpropane tri(meth)acrylate, etc.), but the present invention is not limited thereto.

The active energy ray-polymerizable compound having the cross-linking structure formed in the pressure-sensitive adhesive layer including the IPN may be, for example, included in an amount of 5 parts by weight to 40 parts by weight, relative to 100 parts by weight of the acrylic polymer, but the content of the active energy ray-polymerizable compound may be varied when necessary.

In addition to the above-described components, the pressure-sensitive adhesive layer may include various additives known in the art.

For example, the composition including the active energy ray-curable component may further include a photoinitiator to facilitate a polymerization reaction of the components. Also, the pressure-sensitive adhesive layer may further include at least one additive selected from the group consisting of a silane coupling agent, a tackifier, an epoxy resin, a curing agent, a UV stabilizer, an antioxidant, a toning agent, a reinforcing agent, a filler, an antifoaming agent, a surfactant and a plasticizer.

The pressure-sensitive adhesive layer may be formed, for example, by coating a pressure-sensitive adhesive composition prepared by blending the above-described components using a tool such as a bar coater or a comma coater, and curing the coated pressure-sensitive adhesive composition. Also, a method of curing a pressure-sensitive adhesive composition is not particularly limited. For example, the pressure-sensitive adhesive composition may be cured through a process of maintaining a composition at an appropriate temperature to perform a cross-linking reaction of the acrylic polymer and the multifunctional cross-linking agent, and a process of irradiating a composition with active energy rays to polymerize the active energy ray-curable compound. When both of the process of maintaining a composition at an appropriate temperature and the process of irradiating a composition with active energy rays are required to be performed, the processes may be performed sequentially or simultaneously. As such, the irradiation with the active energy rays may be, for example, performed using a high-pressure mercury lamp, an electrodeless lamp or a xenon lamp, and the conditions such as a wavelength or light intensity of the irradiated active energy rays may be selected to properly perform polymerization of the active energy ray-curable compound.

According to one exemplary embodiment, the pressure-sensitive adhesive layer may have a storage modulus at 25° C. of 0.02 MPa or more, 0.05 MPa or more, greater than 0.08 MPa, greather than 0.08 MPa and 0.25 MPa or less, 0.09 MPa to 0.2 MPa, or 0.09 MPa to 0.16 MPa. For example, such a pressure-sensitive adhesive layer may be a pressure-sensitive adhesive layer including the IPN.

According to another exemplary embodiment, the pressure-sensitive adhesive layer may have a storage modulus at 25° C. of 0.02 MPa to 0.08 MPa or 0.04 MPa to 0.08 MPa. Such a pressure-sensitive adhesive may be a pressure-sensitive adhesive layer including a cross-linking structure of the thermocurable component.

In addition, the present invention is directed to providing a method of manufacturing an optical element. The method of manufacturing an optical element according to one exemplary embodiment may include attaching a polarizer to the liquid crystal layer using the adhesive.

As such, the liquid crystal layer may, for example, be prepared by forming an alignment film on a base layer, forming a coating layer of a liquid crystal composition including the polymerizable liquid crystal compound on the alignment film and polymerizing the liquid crystal composition in an aligned state to form a liquid crystal layer.

The alignment film may be, for example, formed using a method of forming a polymer film such as polyimide on a base layer, and performing a rubbing process or coating an optically aligned compound and aligning the optically aligned compound by irradiation with linearly polarized light. Various methods of forming an alignment film are known in the art in consideration of desired alignment patterns, for example, patterns of the first and second regions.

The coating layer of the liquid crystal composition may be formed by coating a composition on the alignment film of the base layer using a known method. A liquid crystal layer may be formed by aligning a liquid crystal composition according to an alignment pattern of the alignment film disposed under the coating layer and polymerizing the liquid crystal composition.

A method of attaching a liquid crystal layer to a polarizer is not particularly limited. For example, the liquid crystal layer may be attached to the polarizer using a method of coating the above-described adhesive composition on one surface of the liquid crystal layer or the polarizer, bonding the liquid crystal layer and the polarizer by means of the coating layer and curing the adhesive composition, or a method of bonding the liquid crystal layer and the polarizer through a dropping method using an adhesive composition and curing the adhesive composition. As such, the curing of the adhesive composition may be, for example, performed by irradiating the adhesive composition with a proper light intensity of active energy rays in consideration of components in the adhesive composition.

In addition to the above-described operations, the preparation method may further include forming an additional layer such as the protection layer or the ¼-wavelength phase retardation layer. The formation of the additional layer is not particularly limited.

In addition, the present invention is directed to providing a stereoscopic image display device. The stereoscopic image display device according to one exemplary embodiment may include the above-described optical element.

According to one exemplary embodiment, the display device may further include a display element that can generate an image signal for the left eye (hereinafter referred to as an "L signal") and an image signal for the right eye (hereinafter referred to as an "R signal"). The optical element may be arranged so that L and R signals generated on the display element can first penetrate through the polarizer and then enter the liquid crystal layer. According to another exemplary embodiment, the above-described first and second regions having different phase retardation properties are formed on the liquid crystal layer, and may be arranged so that the L signal can penetrate through one of the first and second regions and the R signal can penetrate through the other region. As such, the optical element may be arranged so that the R and L signals can first penetrate through the polarizer of the optical element and then enter each region of the liquid crystal layer when the R and L signals are emitted from the display element.

As long as the stereoscopic image display device includes the optical element as a light-dividing element, a variety of methods known in the art may be applied to manufacture of the stereoscopic image display device.

FIG. 8 is a schematic diagram of a device according to one exemplary embodiment, showing a structure of the device obtained when an observer can wear the polarized glasses and observe a stereoscopic image.

For example, the device 8 may sequentially include a light source 81, a polarizing plate 82, the display element 83 and the optical element 84, as shown in FIG. 8.

As such, a direct type or edge type backlight generally used for liquid crystal display devices (LCDs) may be, for example, used as the light source 81.

According to one exemplary embodiment, the display element 83 may be a transmissive liquid crystal display panel including a plurality of unit pixels which are arranged in a row and/or column direction. One or two or more pixels are combined to form an image signal-generating region for the right eye for generating an R signal (hereinafter referred to as an "RG region") and an image signal-generating region for the left eye for generating an L signal (hereinafter referred to as an "LG region").

The RG and LG regions may be formed in stripe shapes extending in the same direction and alternately arranged adjacent to each other, as shown in FIG. 9, or they may be formed in a lattice pattern and alternately arranged adjacent to each other, as shown in FIG. 10. In the liquid crystal layer 842 of the optical element 84, the first and second regions correspond to the LC and RC regions, respectively, and may be arranged in consideration of the arrangement of the RG and LG regions so that the R signal to be transmitted from the RG region can be incident to the RC region via the polarizer 841 and the L signal can be incident to the LC region via the polarizer 841.

For example, the display element 83 may be a liquid crystal panel including a first transparent substrate, a pixel electrode, a first alignment film, a liquid crystal layer, a second alignment film, a common electrode, a color filter and a second transparent substrate, which are arranged sequentially in a direction from the light source 81. The polarizing plate 82 may be attached to one side of the panel through which light is incident, for example, one side of the light source 81, and the optical element 84 may be attached to the other side of the panel, which is arranged opposite to the one side of the panel. A polarizer included in the polarizing plate 82 and a polarizer 841 included in the optical element 84 may be, for example, arranged so that the absorption axes of the two polarizers can be formed at a predetermined angle, for example, at an angle of 90°. Therefore, the arrangement of the two polarizers may allow light emitted from the light source 81 to penetrate through the display element 83 or be intercepted by the display element 83.

In a driving state, unpolarized light may be emitted toward the polarizing plate 82 from the light source 81 of the display device 8. In the light incident to the polarizing plate 82, light having a polarization axis parallel to the light transmission axis of the polarizer of the polarizing plate 82 may penetrate through the polarizing plate 82 and be incident to the display element 83. Light incident to the display element 83 and penetrating through the RG region may be converted into an R signal, light penetrating through the LG region may be converted into an L signal, and the R and L signals may then be incident to the polarizer 841 of the optical element 84.

In the light incident to the liquid crystal layer 842 through the polarizer 841, light penetrating through the LC region and light penetrating through the RC region are emitted, respectively, in a state where the two kinds of light have different polarized states. As described above, the R and L signals having different polarized states may enter the right and left eyes of an observer wearing the polarized glasses, respectively, and thus the observer may observe a stereoscopic image.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIGS. 2 and 3 are schematic diagrams showing the arrangement of first and second regions of a liquid crystal layer according to one exemplary embodiment.

FIGS. 9 and 10 are schematic diagrams showing the arrangement of RG and LG regions according to one exemplary embodiment.

DETAILED DESCRIPTION OF EXEMPLARY EMBODIMENTS

Figure 1:
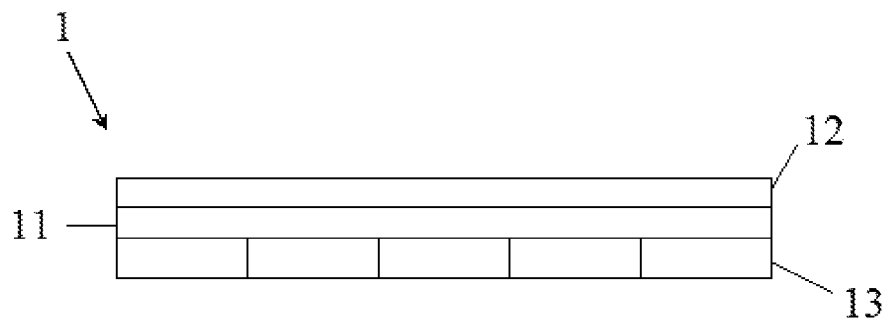
FIG. 1 is a schematic diagram showing an optical element according to one exemplary embodiment of the present invention.
Figure 2:
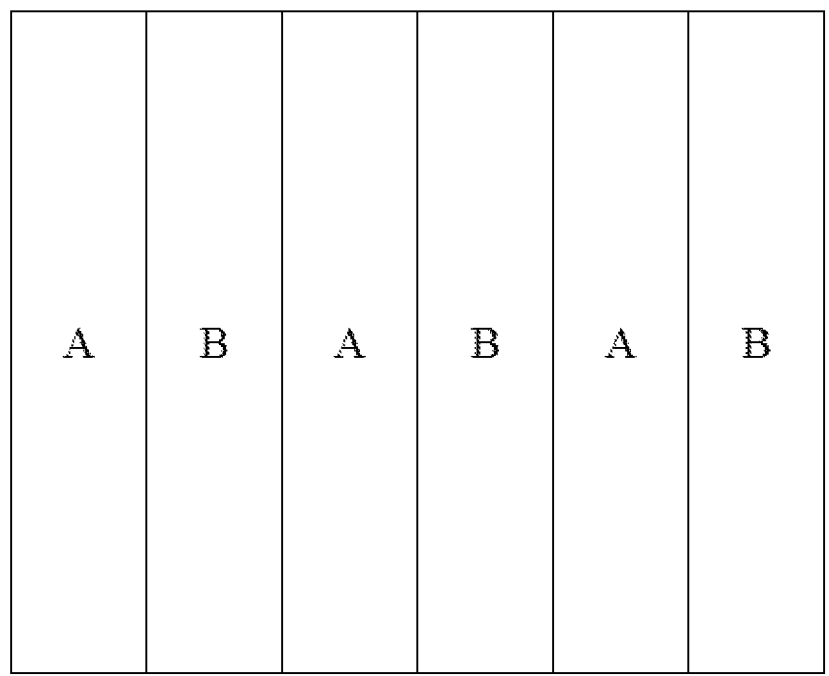
Figure 4:
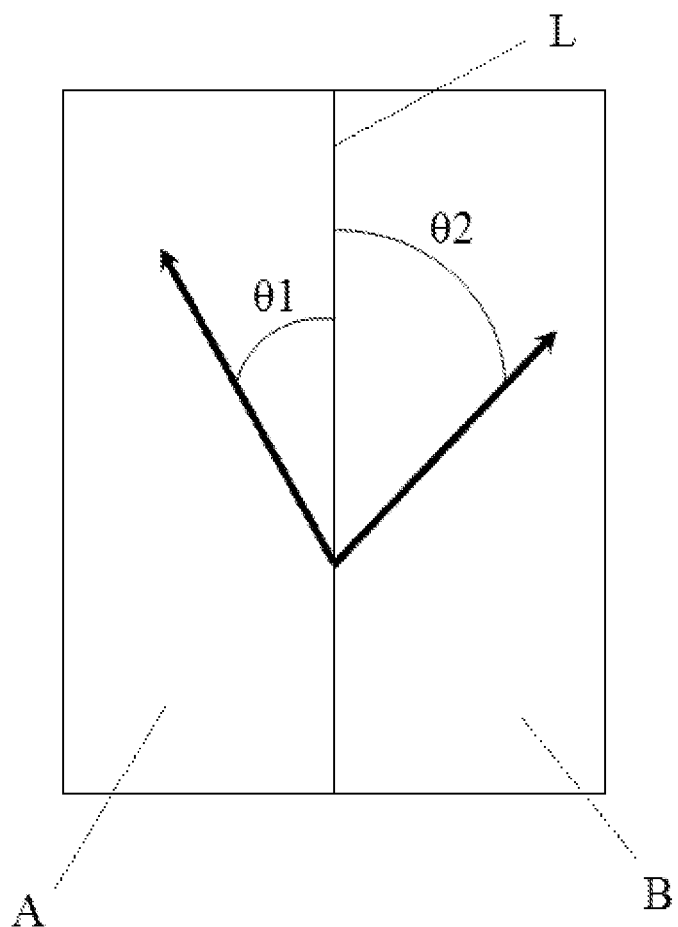
FIG. 4 is a schematic diagram showing the arrangement of optical axes of the first and second regions of the liquid crystal layer according to one exemplary embodiment.
Figure 5:
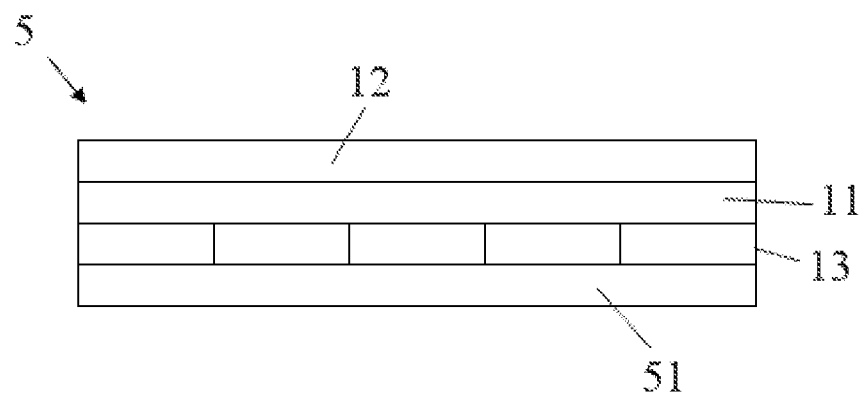
FIGS. 5 to 7 are schematic diagrams showing an optical element according to one exemplary embodiment.
Figure 6:
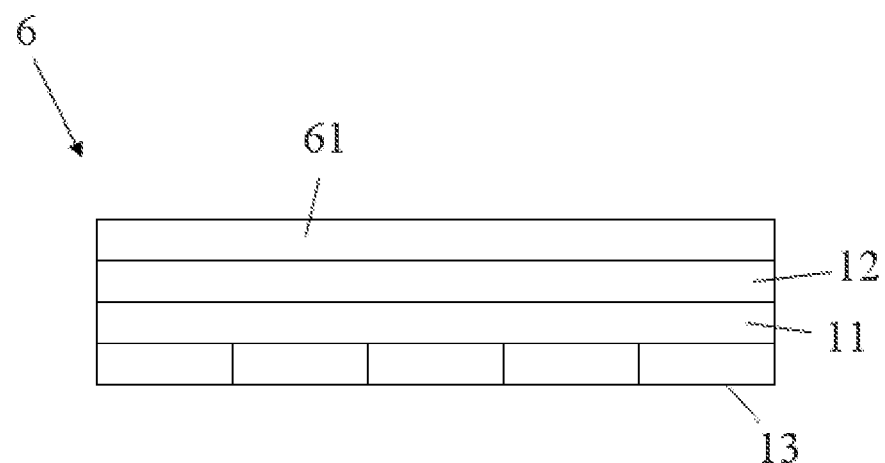
Figure 7:
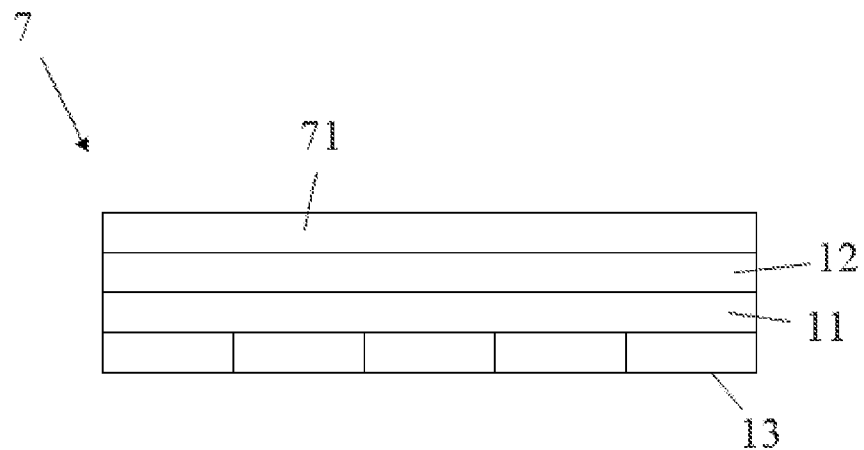
Figure 8:
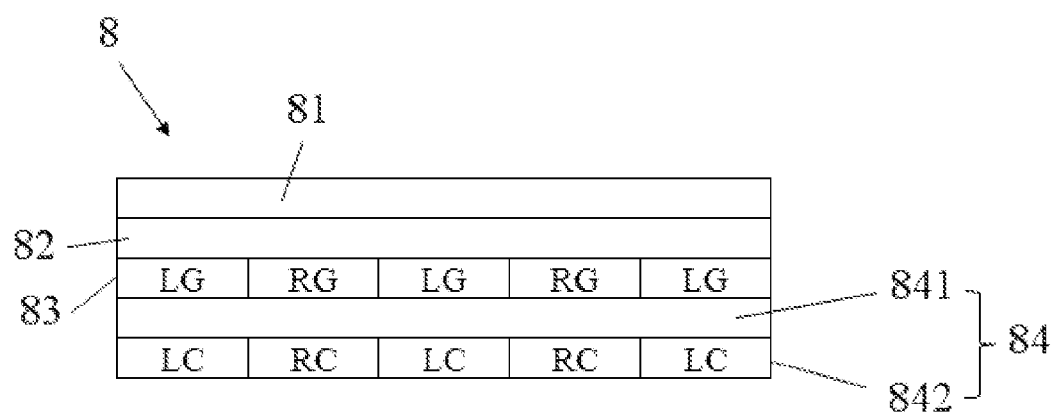
FIG. 8 is a schematic diagram showing a stereoscopic image display device according to one exemplary embodiment.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The physical properties of optical elements prepared in Examples and Comparative Examples were evaluated as follows.

1. Evaluation of Adhesive Strength

The optical elements prepared in Examples and Comparative Examples, in which a base layer, an alignment film, a liquid crystal layer, an adhesive layer and a polarizer were sequentially formed, were evaluated for adhesive strength by peeling the polarizer at a peel angle of 90° and a peel rate of 300 m/min to measure a peel strength of the polarizer to the base layer. A peel test was carried out by cutting a prepared optical element into pieces having a width of 20 mm and a length of 100 mm. The evaluation criteria were as follows.

<Evaluation Criteria>

O: A peel strength exceeds 1 N/cm.

X: A peel strength is 1 N/cm or less.

2. Evaluation of Thermal Shock Property

Each of the optical elements prepared in Examples and Comparative Examples was cut into pieces having a size of 10 cm×10 cm (width×length), and attached to a glass substrate by means of a pressure-sensitive adhesive layer. Thereafter, one cycle of keeping each optical element at −40° C. for 1 hour and keeping the optical element at 80° C. for 1 hour was repeatedly performed 100 times. A change in appearance of the optical element was observed with the naked eye. In this case, the optical element was evaluated as "O" when there was no change in the appearance of the optical element, and evaluated as "X" when changes such as cracks were observed in the optical element.

3. Evaluation of Durability of Liquid Crystal Layer

The durability of a liquid crystal layer was evaluated by measuring a variation of a phase difference value caused after a durability test of the optical elements prepared in Examples and Comparative Examples. More particularly, an optical element was cut into pieces having a size of 10 cm×10 cm (width×length), and then attached to a glass substrate by means of a pressure-sensitive adhesive layer. The optical element was then kept under a heat-resistant condition of 80° C. for 100 hours or 250 hours. Then, a decrease (%) in phase difference values of the liquid crystal layer before and after being kept under the heat-resistant condition was calculated. The results are listed in the followings. As such, the phase difference value was measured at a wavelength of 550 nm according to the manufacturer's manual using Axoscan (commercially available from Axomatrix).

The durability evaluation criteria are as follows.

<Evaluation Criteria>

O: Variations in phase difference values of all the optical elements after being kept under a heat-resistant condition for 100 hours and 250 hours are less than 8%.

X: A variation in phase difference value of any one of the optical elements after being kept under a heat-resistant condition for 100 hours and 250 hours is 8% or more.

4. Crosstalk Evaluation

Figure 9:
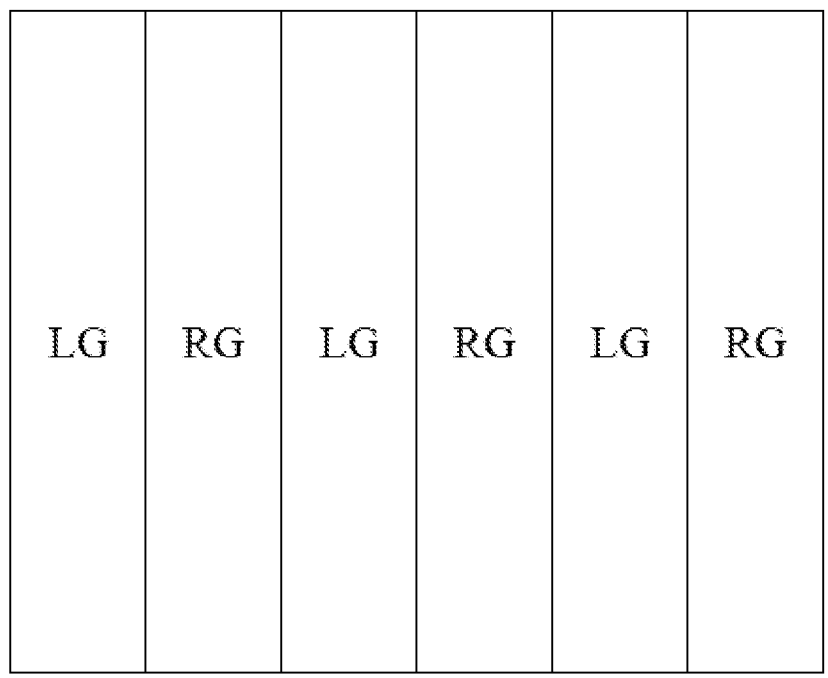

A crosstalk ratio may be defined as a ratio of brightness in a dark state and a bright state when a stereoscopic image is observed. In Examples and Comparative Examples, on the assumption that the optical element is applied to a stereoscopic image display device of a polarized glasses type, a crosstalk ratio is measured using the following method. The optical element is used to constitute a stereoscopic image display device as shown in FIG. 9. Then, the polarized glasses for observing a stereoscopic image are disposed in a conventional observation point for the stereoscopic image display device. As such, when a stereoscopic image is observed by an observer, the conventional observation point refers to a point which is disposed away from the center of the stereoscopic image display device by a distance corresponding to 3/2 of a length in a horizontal direction of the stereoscopic image display device. At such a point, the polarized glasses are positioned on the assumption that the center of the display device is observed by an observer. As such, when it is assumed that the stereoscopic image is observed by the observer, the length in the horizontal direction of the stereoscopic image display device may be a length in a horizontal direction as viewed from the observer, for example, a width of the image display device. In such an arrangement, a luminometer (equipment name: SR-UL2 Spectrometer) is arranged in rear surfaces of lenses for the left and right eyes in the polarized glasses in a state where the stereoscopic image display device is allowed to output an L signal, and each of the lenses for the left and right eyes is measured for brightness. In this case, the brightness measured in the rear surface of the lens for the left eye is bright-state brightness, and the brightness measured in the rear surface of the lens for the right eye is dark-state brightness. After measurement of each brightness, a ratio of the dark-state brightness to the bright-state brightness ([dark-state brightness]/[bright-state brightness]) is converted into a percentage value (%), which may be defined as a crosstalk ratio (Y). Also, the crosstalk ratio may be measured in the same manner as described above, wherein the brightness in the bright and dark states may be measured in a state where a stereoscopic image display device outputs an R signal. In this case, the brightness measured in the rear surface of the lens for the left eye is dark-state brightness, and the brightness measured in the rear surface of the lens for the right eye is bright-state brightness. Similarly, a ratio of the dark-state brightness to the bright-state brightness is converted into a percentage value (%), which may be defined as a crosstalk ratio.

5. Evaluation of Phase Difference and Refractive Index

The phase difference and refractive index of an optical element or a liquid crystal layer were evaluated according to the manufacturer's manual using Axoscan (commercially available from Axomatrix).

6. Evaluation of Thickness and Width or Length of Optical Element

The width or length of an optical element was measured using 3-dimensional equipment, Premium 600C and IView Pro program (INTEK IMS Co., Ltd.). Also, the thickness measurement was performed using a spectral reflectometer, which is equipment that is able to evaluate characteristics of a thin film using interference between light reflected on a surface of the thin film and light reflected on an interface disposed under the thin film or phase difference of the lights.

Preparative Example 1

Preparation of Adhesive Composition (A)

80 parts by weight of N-hydroxyethyl acrylamide, 10 parts by weight of (1,4-dioxaspiro[4,5]dec-2-yl)methyl acrylate and 10 parts by weight of 2-hydroxyethyl acrylate were mixed, and 5 parts by weight of a radical initiator (CGI 819) relative to 100 parts by weight of the solid content of the mixture, was further blended with the resulting mixture to prepare an adhesive composition (A).

Preparative Example 2

Preparation of Adhesive Composition (B)

80 parts by weight of N-hydroxyethyl acrylamide, 10 parts by weight of (1,4-dioxaspiro[4,5]dec-2-yl)methyl acrylate and 10 parts by weight of isobornyl acrylate were mixed, and 5 parts by weight of a radical initiator (CGI 819) relative to 100 parts by weight of the solid content of the mixture, was further blended with the resulting mixture to prepare an adhesive composition (B).

Preparative Example 3

Preparation of Adhesive Composition (C)

60 parts by weight of N-hydroxyethyl acrylamide, 20 parts by weight of (1,4-dioxaspiro[4,5]dec-2-yl)methyl acrylate and 20 parts by weight of 2-hydroxyethyl acrylate were mixed, and 5 parts by weight of a radical initiator (CGI 819) relative to 100 parts by weight of the solid content of the mixture, was further blended with the resulting mixture to prepare an adhesive composition (C).

Preparative Example 4

Preparation of Adhesive Composition (D)

60 parts by weight of N-hydroxyethyl acrylamide and 40 parts by weight of 2-hydroxyethyl acrylate were mixed, and 5 parts by weight of a radical initiator (CGI 819) relative to 100 parts by weight of the solid content of the mixture, was further blended with the resulting mixture to prepare an adhesive composition (D).

Preparative Example 5

Preparation of Adhesive Composition (E)

5 parts by weight of a radical initiator (CGI 819) was blended with 100 parts by weight of 2-hydroxyethyl acrylate to prepare an adhesive composition (E).

Preparative Example 6

Preparation of Liquid Crystal Layer (A)

A composition for forming an optical alignment film was coated on one surface of a TAC base (refractive index: 1.49, thickness: 80,000 nm) so that a thickness after drying could amount to approximately 1,000 Å, and dried at 80° C. for 2 minutes in an oven. As the above-described composition for forming an optical alignment film, a composition was used, which was prepared by mixing a mixture of an acryl monomer and polynorbornene (molecular weight $(M_w)$=150,000) having a cinnamate group of the following Formula 14 with a photoinitiator (Irgacure 907) and dissolving the mixture in a toluene solvent so that a solid concentration of the polynorbornene could amount to 2% by weight (polynorbornene:acryl monomer:photoinitiator=2:1:0.25 (weight ratio)).

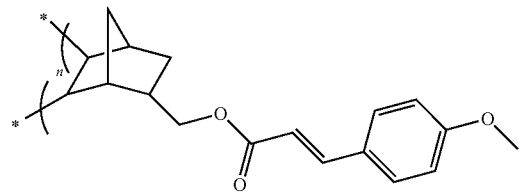

Formula 14

Next, the dried composition for forming an optical alignment film was aligned according to a method disclosed in Korean Patent Application No. 2010-0009723 to form an optical alignment film including first and second alignment regions which are aligned in different directions. More particularly, a pattern mask in which light-transmitting portions and light-intercepting portions in stripe shapes having widths of approximately 450 μm were alternately formed in a vertical direction and a horizontal direction was disposed on an upper portion of the dried composition, and a polarizing plate having two regions formed therein for transmitting two different kinds of polarized light was also disposed on an upper portion of the pattern mask. Then, the composition for forming an optical alignment film was aligned by irradiating the composition with UV rays (300 mW/cm$^2$) for approximately 30 seconds using the polarizing plate and the pattern mask while transferring the TAC base 30 having the optical alignment film formed thereon at a rate of approximately 3 m/min. Then, a liquid crystal layer was formed on the alignment layer undergoing the alignment treatment. More particularly, a liquid crystal composition including 70 parts by weight of a multifunctional polymerizable liquid crystal compound represented by the following Formula A, 30 parts by weight of a monofunctional polymerizable liquid crystal compound represented by the following Formula B, and a suitable amount of a photoinitiator was coated onto the optical alignment film to a dry thickness of approximately 1 μm, and the liquid crystal composition was aligned according to alignment of the alignment layer arranged under the liquid crystal layer. Then, a liquid crystal layer, which includes first and second regions having different optical axes perpendicular to each other according to the alignment of the optical alignment film arranged under the liquid crystal layer, was formed by cross-linking and polymerizing liquid crystals by irradiating the liquid crystals with UV rays (300 mW/cm$^2$) for approximately 10 seconds. In the liquid crystal layer, a difference between refractive indexes in a slow axis direction and fast axis direction was approximately 0.125.

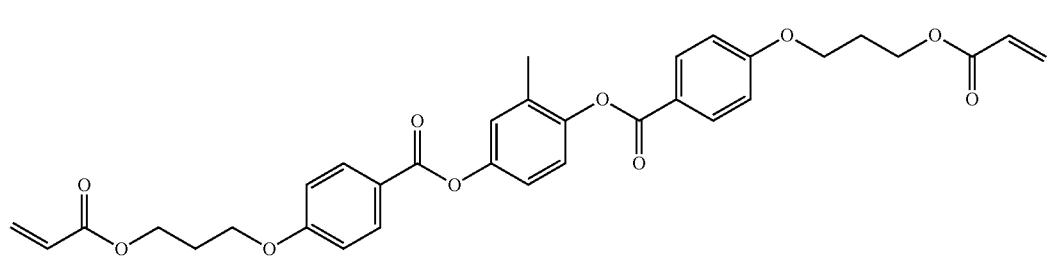

Formula A

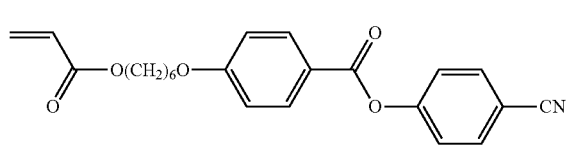

Formula B

Preparative Examples 7 to 10

Preparation of Liquid Crystal Layer (B) to Liquid Crystal Layer (E)

Liquid crystal layers were prepared in the same manner as in Preparative Example 6, except that a weight ratio of a multifunctional polymerizable liquid crystal compound and a monofunctional polymerizable liquid crystal compound included in the liquid crystal composition was adjusted as listed in the following Table 1.

TABLE 1

|  | Liquid crystal layer (B) | Liquid crystal layer (C) | Liquid crystal layer (D) | Liquid crystal layer (E) |
|---|---|---|---|---|
| Multifunctional polymerizable liquid crystal compound (A) | 55 | 45 | 40 | 10 |
| Monofunctional polymerizable liquid crystal compound (B) | 45 | 55 | 60 | 90 |
| Refractive index difference | 0.125 | 0.125 | 0.125 | 0.125 |
| Thickness (μm) | 1 | 1 | 1 | 1 |

Content unit: parts by weight

Example 1

An optical element was manufactured as follows. First, in a structure prepared in Preparative Example 6 that is, a structure in which a TAC base, an alignment film and a liquid crystal layer (A) were sequentially formed, the liquid crystal layer was attached to the polarizer of the polarizing plate, which included a PVA-based polarizer having a transparent protective film formed on one surface thereof, using an adhesive composition (A). More particularly, a surface of the liquid crystal layer was coated with the adhesive composition to a thickness after curing of 5 μm, and the polarizer was laminated on the liquid crystal layer. Then, an adhesive layer was formed by irradiating UV rays of a UV A band toward one surface of the transparent protective film (500 mJ/cm$^2$), and the liquid crystal layer was then attached to the polarizer. Thereafter, a conventional acrylic pressure-sensitive adhesive layer was formed on one surface of the transparent protective film of the polarizer to manufacture an optical element.

Examples 2 to 4

Each optical element was manufactured in the same manner as in Example 1, except that liquid crystal layers, the kinds of adhesive compositions and the thickness of an adhesive layer to be formed were changed as listed in the following Table 2, and the UV irradiation conditions were adjusted to sufficiently cure the adhesive compositions.

TABLE 2

|  |  | Liquid crystal layers | Kinds of adhesive compositions | Adhesive layer thickness (μm) |
|---|---|---|---|---|
| Examples | 2 | Liquid crystal layer (A) | Adhesive composition (B) | 5 |
|  | 3 | Liquid crystal layer (A) | Adhesive composition (C) | 5 |
|  | 4 | Liquid crystal layer (B) | Adhesive composition (C) | 5 |

Comparative Examples 1 to 10

Optical elements were manufactured in the same manner as in Example 1, except that the kinds of liquid crystal layers, adhesive compositions and the thickness of an adhesive layer to be formed were changed as listed in the following Table 3, and the UV irradiation conditions were adjusted to sufficiently cure the adhesive compositions.

TABLE 3

|  |  | Liquid crystal layer | Kinds of adhesive compositions | Adhesive layer thickness (μm) |
|---|---|---|---|---|
| Comparative Examples | 1 | Liquid crystal layer (A) | Adhesive composition (E) | 5 |
|  | 2 | Liquid crystal layer (C) | Adhesive composition (A) | 5 |
|  | 3 | Liquid crystal layer (D) | Adhesive composition (A) | 5 |
|  | 4 | Liquid crystal layer (D) | Adhesive composition (B) | 5 |
|  | 5 | Liquid crystal layer (D) | Adhesive composition (C) | 5 |
|  | 6 | Liquid crystal layer (D) | Adhesive composition (D) | 5 |
|  | 7 | Liquid crystal layer (E) | Adhesive composition (A) | 5 |
|  | 8 | Liquid crystal layer (E) | Adhesive composition (B) | 5 |
|  | 9 | Liquid crystal layer (E) | Adhesive composition (C) | 5 |
|  | 10 | Liquid crystal layer (E) | Adhesive composition (D) | 5 |

The optical elements prepared in Examples and Comparative Examples were evaluated for physical properties using the above-described method. The evaluation results are listed in the following Tables 4 and 5, respectively.

TABLE 4

|  |  |  |  |  | Changes in phase difference (after being kept for 100 hours) | | |
|---|---|---|---|---|---|---|---|
|  |  | Adhesive strength | Thermal shock property | Durability of liquid crystal layers | Initial phase difference (nm) | Phase difference (nm) after being kept at heating conditions | Changes (%) |
| Examples | 1 | ○ | ○ | ○ | 125.4 | 119.7 | 4.5 |
|  | 2 | ○ | ○ | ○ | 125.4 | 119.7 | 4.5 |
|  | 3 | ○ | ○ | ○ | 125.4 | 119.7 | 4.5 |
|  | 4 | ○ | ○ | ○ | 120.7 | 114.1 | 5.5 |

TABLE 5

|  |  | Adhesive strength | Thermal shock property | Durability of liquid crystal layers | Initial phase difference (nm) | Changes in phase difference (after being kept for 100 hours) | |
|---|---|---|---|---|---|---|---|
|  |  |  |  |  |  | Phase difference (nm) after being kept at heating conditions | Changes (%) |
| Comparative Example | 1 | ○ | X | ○ | 125.4 | 119.7 | 4.5 |
|  | 2 | X | ○ | X | 94.1 | 85.5 | 9.1 |
|  | 3 | X | ○ | X | 77.2 | 69.4 | 10.1 |
|  | 4 | X | ○ | X | 77.2 | 69.4 | 10.1 |
|  | 5 | X | ○ | X | 77.2 | 69.4 | 10.1 |
|  | 6 | X | X | X | 77.2 | 69.4 | 10.1 |
|  | 7 | X | ○ | X | — | — | — |
|  | 8 | X | ○ | X | — | — | — |
|  | 9 | X | ○ | X | — | — | — |
|  | 10 | X | X | X | — | — | — |

—: A phase difference value cannot be measured since a liquid crystal layer is in a non-aligned state.

Experimental Example 1

Evaluation of Refractive Index Relationship of Liquid Crystal Layer and Light Division Property According to Thickness In order to evaluate the refractive index relationship of a liquid crystal layer and a light division property of the liquid crystal layer according to a thickness, a sample was prepared, as will be described later. More particularly, a phase retardation layer was formed in the same manner as in Preparative Example 6, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.03 after formation of the liquid crystal layer. Also, a phase retardation layer was prepared in the same manner using the same liquid crystal compound as in Preparative Example 6, wherein the phase retardation layer was prepared by forming liquid crystal layers having thicknesses of approximately 0.3 μm and 2.5 μm. Also, a phase retardation layer was formed in the same manner as in Preparative Example 6, wherein the phase retardation layer was prepared by forming liquid crystal layers having thicknesses of approximately 0.3 μm, 1 μm and 2.5 μm, respectively, by adjusting compositions of a liquid crystal mixture so that a difference between refractive indexes in a slow axis direction and a fast axis direction could amount to 0.22 after formation of the liquid crystal layer. Thereafter, an optical element was prepared in the same manner as in Example 1 using the prepared phase retardation layer, and crosstalk ratios obtained when the prepared optical element and the optical element of Example 1 were used to observe a stereoscopic image were evaluated. The results are listed in the following Table 6.

TABLE 6

| Liquid crystal layers of phase retardation layers | | |
|---|---|---|
| Refractive index difference* | Thickness (μm) | Crosstalk ratio (%) |
| 0.03 | 0.3 | 79.5 |
| 0.03 | 1 | 45.3 |
| 0.03 | 2.5 | 10.3 |
| 0.125 | 0.3 | 36 |
| 0.125 | 1 | 0.5 |
| 0.125 | 2.5 | 177.4 |
| 0.22 | 0.3 | 14.6 |
| 0.22 | 1 | 30.7 |
| 0.22 | 2.5 | 121.6 |

Refractive index difference represents a difference between in-plane refractive indexes of a liquid crystal layer in a slow axis direction and fast axis direction.

The optical element according to one exemplary embodiment of the present invention may be a light-dividing element, for example an element that can divide incident light into at least two kinds of light having different polarized states. For example, the optical element can be used to realize a stereoscopic image.

While the invention has been shown and described with reference to certain exemplary embodiments thereof, it will be understood by those skilled in the art that various changes in form and details may be made therein without departing from the scope of the invention as defined by the appended claims.

What is claimed is:

1. An optical element comprising a polarizer and a liquid crystal layer which are attached to each other by an adhesive layer comprising a cured active energy ray-curable adhesive composition including an acrylamide-based radically polymerizable compound, the liquid crystal layer having a difference between in-plane refractive indexes in a slow axis direction and a fast axis direction of 0.05 to 0.2 and a thickness of 0.5 μm to 2.0 μm, and satisfying the following Equation 1:

$$X < 8\%  \qquad \text{Equation 1}$$

wherein X represents a percentage of a variation in a phase difference value of the liquid crystal layer obtained after keeping the optical element at 80° C. for 100 hours, relative to the initial phase difference value of the liquid crystal layer of the optical element.

2. The optical element of claim 1, wherein the acrylamide-based radically polymerizable compound is a compound represented by the following Formula 1:

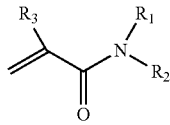

Formula 1 wherein $R_1$ and $R_2$ are each independently hydrogen, an alkyl group or a hydroxyalkyl group, or $R_1$ and $R_2$ are joined together to form a heterocyclic structure containing a nitrogen atom, and $R_3$ is hydrogen or an alkyl group.

3. The optical element of claim 2, wherein the alkyl group is an alkyl group having 1 to 20 carbon atoms, and the heterocyclic structure contains 3 to 20 ring-membered atoms.

4. The optical element of claim 1, wherein the adhesive composition further comprises a radically polymerizable compound having a heterocyclic acetal structure.

5. The optical element of claim 4, wherein the heterocyclic acetal structure contains 4 to 20 ring-membered atoms.

6. The optical element of claim 4, wherein the heterocyclic acetal structure is represented by the following Formula 2 or 3:

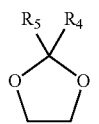

Formula 2

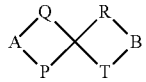

Formula 3 wherein $R_4$ and $R_5$ each independently represent hydrogen or an alkyl group, Q, P, R and T each independently represent a carbon atom or an oxygen atom, provided that two out of Q, P, R and T are oxygen atoms, and A and B each independently represent an alkylene or alkylidene group having 1 to 5 carbon atoms.

7. The optical element of claim 4, wherein the radically polymerizable compound having the heterocyclic acetal structure is represented by the following Formula 4:

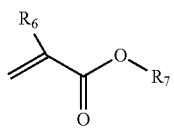

Formula 4 wherein $R_6$ represents hydrogen or an alkyl group, and $R_7$ is a monovalent residue derived from the structure of Formula 2 or 3 defined in claim 6, or an alkyl group substituted with the monovalent residue.

8. The optical element of claim 4, wherein the adhesive composition comprises 20 parts by weight to 80 parts by weight of the radically polymerizable compound having the heterocyclic acetal structure, relative to 100 parts by weight of the acrylamide-based radically polymerizable compound.

9. The optical element of claim 1, wherein the adhesive composition further comprises a compound represented by the following Formula 5:

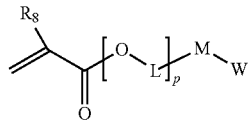

Formula 5 wherein $R_8$ represents hydrogen or an alkyl group, L represents an alkylene group or an alkylidene group, M represents a single bond, an oxygen atom or a sulfur atom, W represents an aryl group, and p represents an integer ranging from 0 to 3.

10. The optical element of claim 1, wherein the adhesive composition further comprises a compound represented by the following Formula 6:

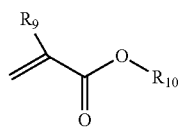

Formula 6 wherein $R_9$ represents hydrogen or an alkyl group, and $R_{10}$ represents a monovalent alicyclic hydrocarbon group.

11. The optical element of claim 1, wherein the adhesive composition further comprises a compound represented by the following Formula 7:

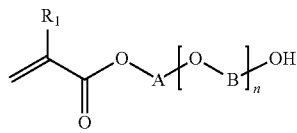

Formula 7 wherein $R_1$ represents hydrogen or an alkyl group, A and B each independently represent an alkylene group or an alkylidene group, and n represents an integer ranging from 0 to 5.

12. The optical element of claim 1, wherein the adhesive composition further comprises a radical initiator.

13. The optical element of claim 1, wherein the liquid crystal layer comprises a multifunctional polymerizable liquid crystal compound and a monofunctional polymerizable liquid crystal compound in a polymerized form.

14. The optical element of claim 13, wherein the polymerizable liquid crystal compound is a compound represented by the following Formula 8:

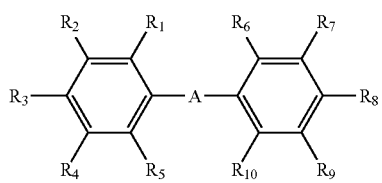

Formula 8 wherein A is a single bond, —COO— or —OCO—, and $R_1$ to $R_{10}$ are each independently hydrogen, a halogen, an alkyl group, an alkoxy group, an alkoxycarbonyl group, a cyano group, a nitro group, —O-Q-P or a substituent of the following Formula 9, provided that at least one of the substituents $R_1$ to $R_{10}$ is —O-Q-P or a substituent of the following Formula 9, or two adjacent substituents of $R_1$ to $R_5$ or two adjacent substituents of $R_6$ to $R_{10}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group,

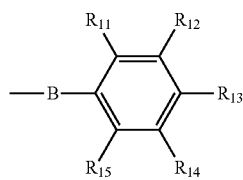

Formula 9 wherein B is a single bond, —COO— or —OCO—, and $R_{11}$ to $R_{15}$ are each independently hydrogen, a halogen, an alkyl group, an alkoxy group, an alkoxycarbonyl group, a cyano group, a nitro group or —O-Q-P, provided that at least one of substituents $R_{11}$ to $R_{15}$ is —O-Q-P, or two adjacent substituents of $R_{11}$ to $R_{15}$ are joined together to form a benzene ring substituted with —O-Q-P, wherein Q is an alkylene group or an alkylidene group, and P is an alkenyl group, an epoxy group, a cyano group, a carboxyl group, an acryloyl group, a methacryloyl group, an acryloyloxy group or a methacryloyloxy group.

15. The optical element of claim 13, wherein the monofunctional polymerizable liquid crystal compound is comprised in the liquid crystal layer in an amount of greater than 0 parts by weight and 100 parts by weight or less, relative to 100 parts by weight of the multifunctional polymerizable liquid crystal compound.

16. The optical element of claim 1, wherein the liquid crystal layer includes first and second regions having different phase retardation properties.

17. The optical element of claim 16, wherein the first and second regions have optical axes formed in different directions to each other.

18. The optical element of claim 17, wherein a line bisecting an angle formed between the optical axes of the first region and the second region is formed to be vertical or horizontal with respect to the absorption axis of the polarizer.

19. The optical element of claim 1, further comprising:
a pressure-sensitive adhesive layer which is formed on one surface of the polarizer, which has a storage modulus at 25° C. of 0.02 MPa to 0.08 MPa and which has a cross-linking structure of an acrylic polymer cross-linked by means of a multifunctional cross-linking agent.

20. The optical element of claim 1, further comprising:
a pressure-sensitive adhesive layer which is formed on one surface of the polarizer, which has a storage modulus at 25° C. of greater than 0.08 MPa, and which has both of a cross-linking structure including an acrylic polymer cross-linked using a multifunctional cross-linking agent and a cross-linking structure including a polymerized active energy ray-polymerizable compound.

21. A stereoscopic image display device comprising the optical element defined in claim 1.

22. The stereoscopic image display device of claim 21, further comprising a display element configured to generate image signals for left and right eyes,
wherein the liquid crystal layer of the optical element comprises first and second regions having different phase retardation properties, and
the first and second regions of the liquid crystal layer in the optical element are arranged so that an image signal for the left eye can pass through one of the first and second regions and an image signal for the right eye can pass through the other region.

* * * * *